Figure 1:
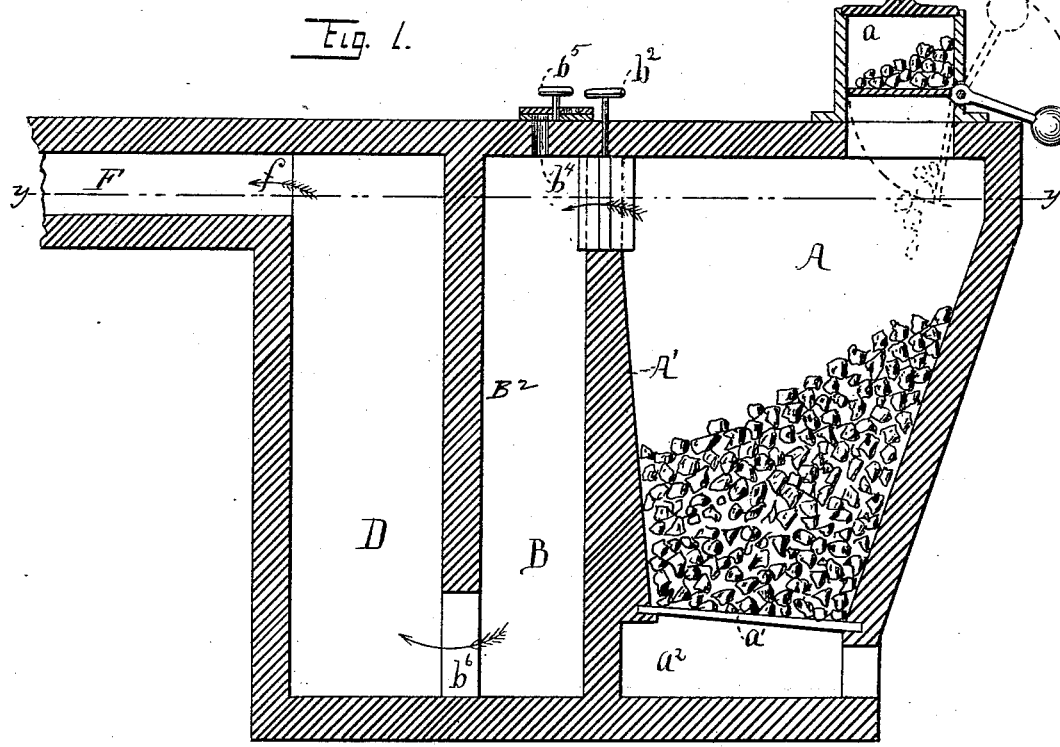

(No Model.) 3 Sheets—Sheet 1.

J. H. CREMER.
METHOD OF AND APPARATUS FOR HEATING THE GASEOUS FUEL OF FURNACES.

No. 278,889. Patented June 5, 1883.

Witnesses:
O. L. Owen
J. O. Morris

Inventor:
John H. Cremer
By Prince & Fisher
Attorneys.

(No Model.) 3 Sheets—Sheet 2.
J. H. CREMER.
METHOD OF AND APPARATUS FOR HEATING THE GASEOUS FUEL OF FURNACES.
No. 278,889. Patented June 5, 1883.
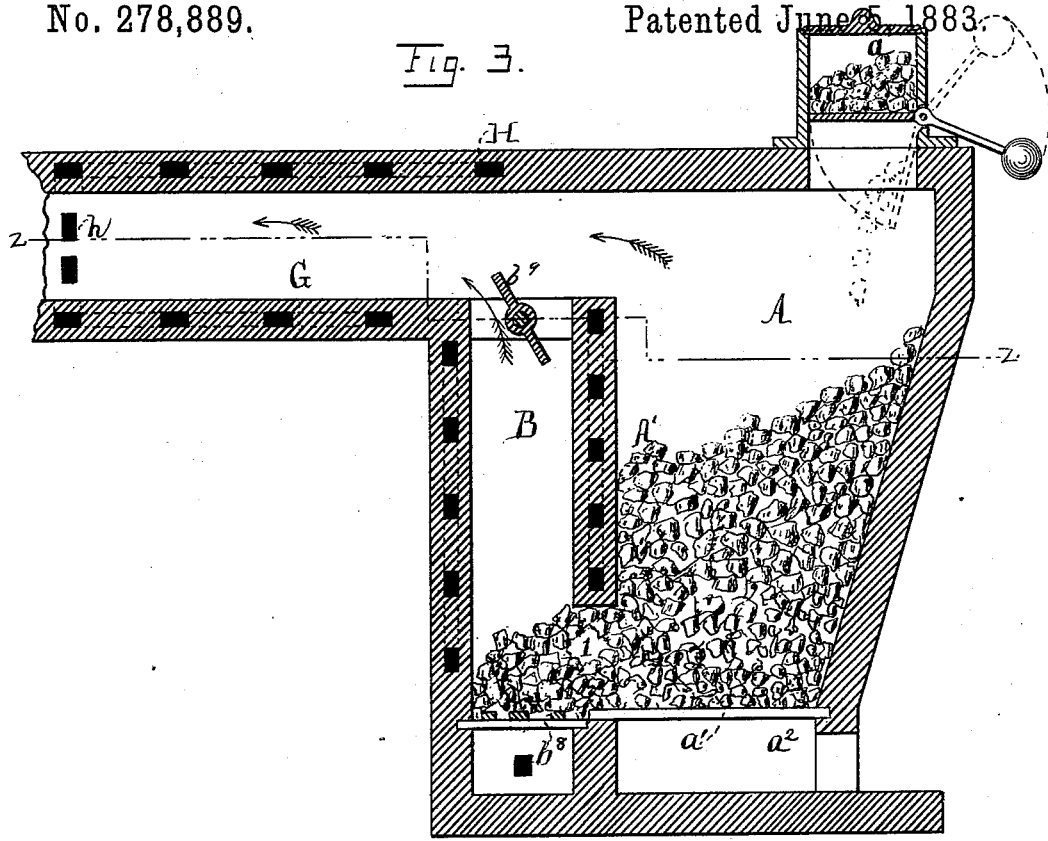
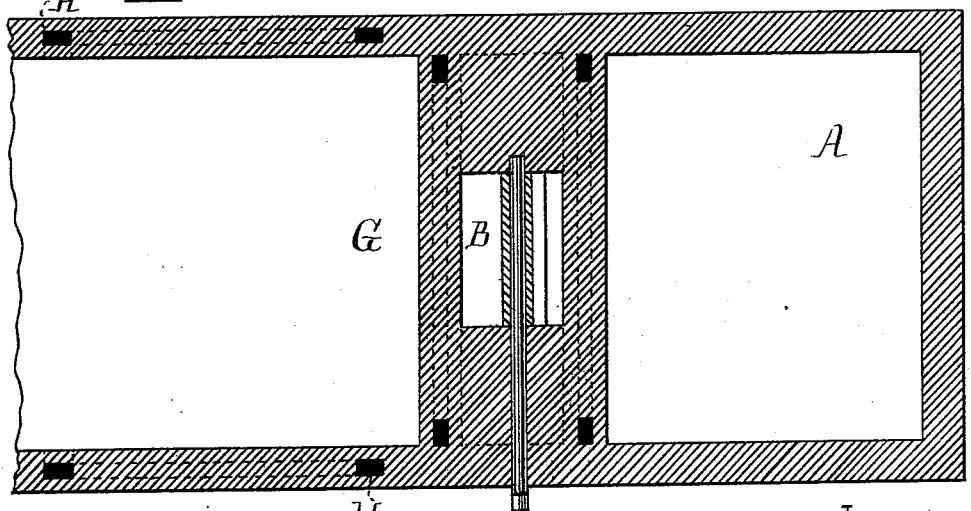
Witnesses:
O. L. Owen.
J. O. Morris.
Inventor:
John H. Cremer
By Rica & Fisher
Attorneys.
N. PETERS. Photo-Lithographer, Washington, D. C.

(No Model.)
3 Sheets—Sheet 3.
J. H. CREMER.
METHOD OF AND APPARATUS FOR HEATING THE GASEOUS FUEL OF FURNACES.
No. 278,889.
Patented June 5, 1883.
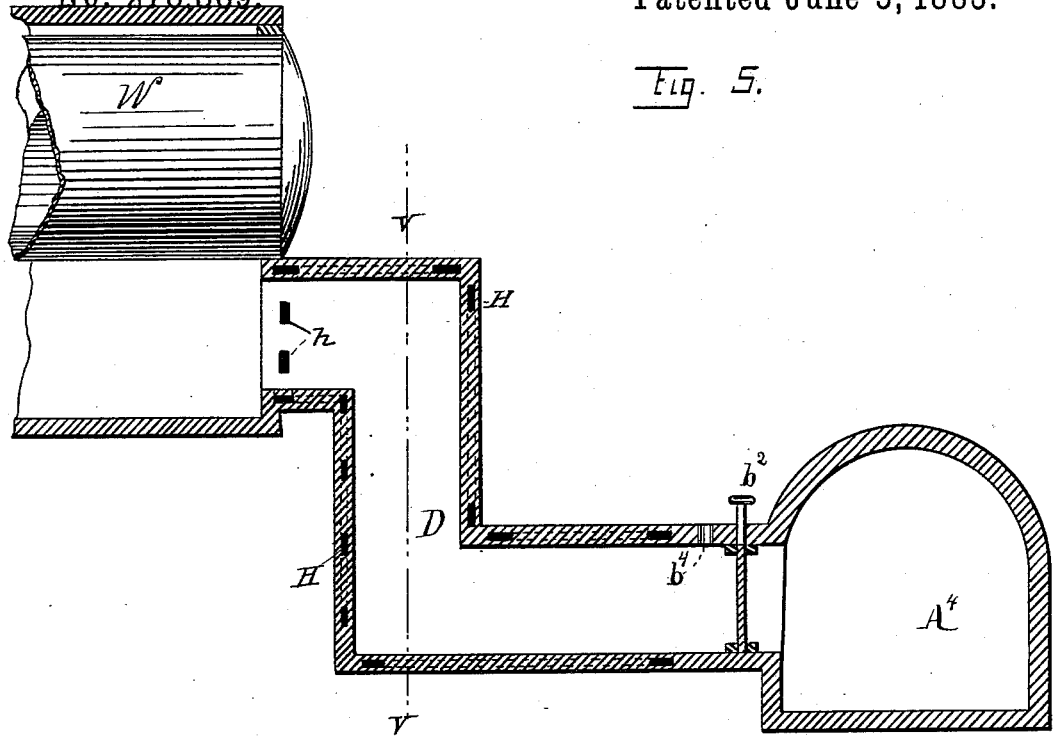
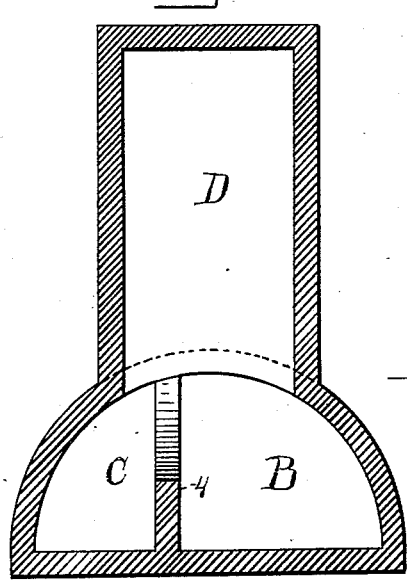
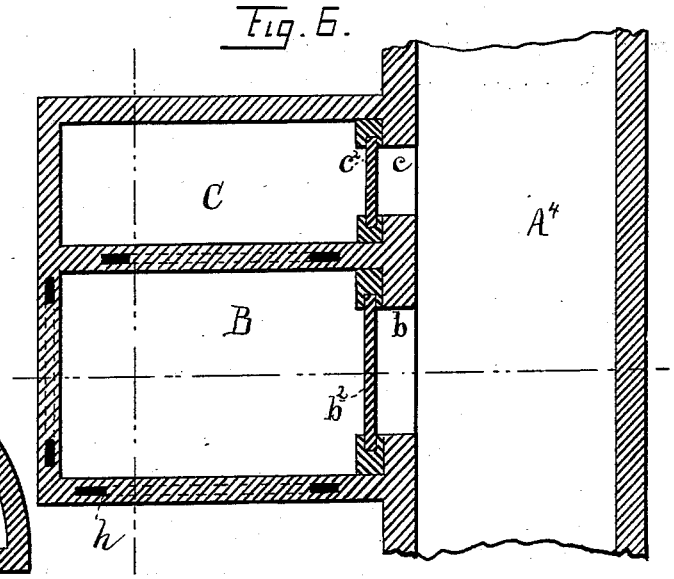
Witnesses:
O. L. Owen.
J. O. Morris.
Inventor:
John H. Cremer
By Prince & Fisher
Attorneys.

UNITED STATES PATENT OFFICE.

JOHN H. CREMER, OF CHICAGO, ILLINOIS.

METHOD OF AND APPARATUS FOR HEATING THE GASEOUS FUEL OF FURNACES.

SPECIFICATION forming part of Letters Patent No. 278,889, dated June 5, 1883.

Application filed January 16, 1883. (No model.)

*To all whom it may concern:*

Be it known that I, JOHN H. CREMER, a subject of the King of Holland, and a resident of Chicago, in the county of Cook and State of Illinois, have invented certain new and useful Improvements in Method of and Apparatus for Heating the Gaseous Fuel of Furnaces, of which the following is a full, clear, and exact description.

Since it is necessary, in order to secure the most perfect conditions for its combustion, that gaseous fuel should be highly preheated, and should be supplied with a sufficient quantity of air delivered thereto in a highly-heated state, it has become customary to provide furnaces wherein it is desired to produce intense heat, especially such as are used for metallurgical operations, glass melting, and the like, with some means for highly heating the gas and air before their introduction into the combustion-chamber. This preheating is now commonly effected by means of what are known as "regenerators," "hot-blast ovens," or the like, in which the gas and air are raised to a high degree of heat by passing them over brickwork previously made intensely hot by escaping products of combustion, or by passing them through delivery-pipes arranged within a heated chamber. This manner of preheating the gas and air necessitates the construction of elaborate and costly plants, which are expensive in operation and require the most constant and careful attention. It is a common expedient, also, in puddling, boiler, or other furnaces, where an air-blast alone is to be heated, to supply the air through delivery-channels located at such points in the furnace-walls as to become highly heated before reaching the combustion-chamber; but this method of heating cannot be relied on for an extremely hot blast.

The object of my present invention is to supply a process of heating the gas and air of a furnace, which, while highly effective, is exceedingly simple in practice, and requires for its operation no expensive outlay in furnace-structure, and to this end my invention consists in the several details of process hereinafter fully set forth, and particularly pointed out in the claims, and in the apparatus hereinafter, described, claimed, and illustrated in the accompanying drawings.

Figure 2:
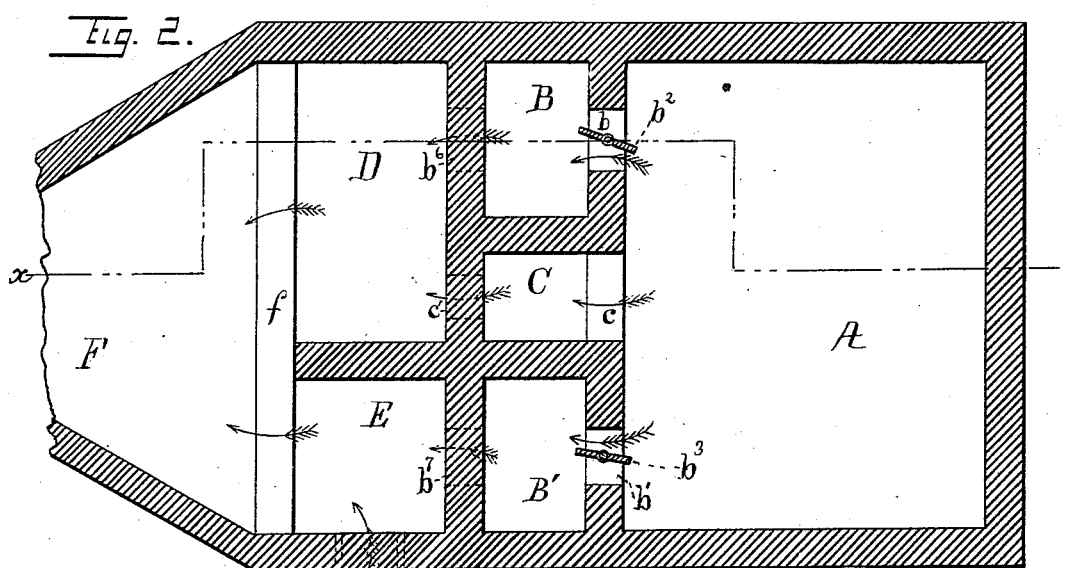

Figure 1 is a view in vertical longitudinal section on line $x\,x$ of Fig. 2 of an improved furnace for carrying out my invention. Fig. 2 is a view in transverse longitudinal section on line $y\,y$ of Fig. 1. Fig. 3 is a view in vertical longitudinal section of a modified form of furnace. Fig. 4 is a view in transverse longitudinal section on line $z'\,z'$ of Fig. 3. Fig. 5 is a view in vertical longitudinal section of a modified form of furnace for carrying out my invention as applied to the heating of blast-furnace gases. Fig. 6 is a view in transverse longitudinal section on line $w\,w$ of Fig. 5, and Fig. 7 is a view in transverse vertical section on line $v\,v$ of Fig. 5.

In Figs. 1 and 2 of the drawings, A designates the generator or gas-supply chamber, which is provided at its top with hopper $a$ and at its bottom with the grate-bars $a'$ and ash-pit $a^2$, of usual construction. Adjoining the generator A are the chambers B, B', and C, which communicate with the generator by means of the gas-inlets $b$, $b'$, and $c$ at the upper portion of the wall A', the inlets $b\,b'$ being provided, respectively, with the valves $b^2$ and $b^3$, of suitable construction. The chambers B B' are what I designate the "primary combustion-chambers," and are provided at their tops with the air-ducts $b^4$, having registers $b^5$, and at their bottoms with the outlets $b^6$ and $b^7$, formed in the bottom of the wall B$^2$, and communicating, respectively, with the heating-chambers D and E. The central chamber, C, is the gas-delivery chamber, and has at its bottom the outlet $c'$, leading to the gas-heating chamber D. The chamber E, which is the air-heating chamber, is provided near its bottom with the induction-pipe E' for the admission of atmospheric air in sufficient quantity to completely burn the gas from the generator, the quantity admitted being controlled by the valve $e$. At the top of the chambers D and E is formed the broad outlet $f$, for the ready admission of the gas and air from the chambers D and E into the mixing-chamber F, in which combustion of the mixed gas and air begins, and which communicates with the main combustion-chamber of the furnace.

From the above-described construction it will appear that as the gas is supplied from the generator A in a warm condition it is divided, portions of it passing through each of the inlets $b$, $b'$, and $c$ into the chambers B, B', and C. The gas passing into the primary combustion-chambers B and B' is met by air delivered through the air-ducts $b^4$ in sufficient quantity to support combustion, and is ignited and completely burned in these chambers. By thus taking the gas immediately as it issues from the producer, a more complete combustion is obtained in the primary combustion-chamber than would be possible were the gas delivered thereto cold, and it is necessary in order to secure the best results that the combustion in the chambers B and B' should be as complete and intense as possible, and that the resultant products should be delivered at once to and intimately mixed with the main volume of gas and air to be heated. From the chambers B and B' the products of combustion at a high degree of heat pass through the outlets $b^6$ and $b^7$ into the heating-chambers D and E. In the first of these chambers, D, the hot products of combustion are met by the stream of gas from the gas-chamber C, and are thoroughly mixed with and impart to said gas their entire heat, and in the air-heating chamber E the hot products of combustion from the chamber B' impart an intense heat to the main volume of atmospheric air delivered in regulated quantity through the induction-pipe E'. It will be apparent that in the gas-heating chamber the flames from the primary combustion-chamber will be extinguished by the large volume of gas admitted thereto. From the heating-chambers D and E the now highly-heated gas and air pass to the mixing-chamber F, where combustion begins, and from which they will be delivered to the main combustion-chamber of the furnace. The primary combustion-chambers B B' are made of a size sufficient to allow for the expansion incident to complete combustion. It is obvious from the construction shown that, if desired, the gas-supply only may be heated by closing the valve $b^3$ of the inlet $b'$; or the air-supply alone may be heated by closing the valve between the primary combustion-chamber B and the generator A, although it will be found more advantageous in practice to heat both the air and gas in the manner described; and in the form of furnace illustrated in Figs. 3 and 4 of the drawings the air-supply is heated in a manner common in puddling and other furnaces—namely, by delivering it through channels formed in the walls—while the gas-supply is heated in accordance with my invention. In this furnace the fuel-chamber or generator A, having the usual hopper, grate-bars, and ash-pit, is provided at its bottom with an opening, 1, formed in the partition-wall A', and connecting the generator A with the combustion-chamber B in such manner that a portion of the fuel shall pass from the generator and shall burn upon the grate-bars $b^8$ of the chamber B, through which air is supplied in sufficient quantity to produce complete combustion. The top of the chamber B is partially bricked over, as shown in Fig. 4, and is furnished with a suitable valve, $b^9$, to regulate the escaping products of combustion. As the main body of gas passes from the generator A over the wall A' it is met by and intimately mixed with the hot products from the combustion-chamber B, and receives therefrom an intense heat. As the now highly-heated gas passes through the eduction-channel G on its way to the combustion-chamber of a boiler, metallurgical or other furnace, it is mixed with the hot-air blast delivered from the embedded flues H, through the discharge-orifices $h$, in sufficient quantity to support combustion.

In Figs. 5, 6, and 7 I have illustrated my invention as applied to the heating of gaseous fuel delivered from an extraneous source, and this form of my invention is especially advantageous for use in connection with boiler or other furnaces which are supplied with the waste gases from blast-furnaces. In this form of apparatus the volume of gas is delivered through the main or supply chamber $A^4$, which communicates with the chambers B and C by the gas-inlets $b$ and $c$, provided with regulating-valves $b^2$ and $c^2$, of suitable construction. The chamber B is the primary combustion-chamber, and is furnished at its top with the air-ducts $b^4$ and at its end with the gas-outlet leading to the mixing chamber or flue D. The gas-chamber C connects with chamber B at the end of the partition-wall 4, this wall being cut away for this purpose, as shown in Fig. 7. As the gas is delivered from the main $A^4$ a portion of it enters the primary combustion-chamber B, and is there completely burned, while the main portion passes through the gas-chamber into the mixing chamber or flue D, where it meets the hot products of combustion issuing from the chamber B, and throughly mixed with and becomes highly heated thereby. The air-blast is heated in its passage through the flues or channels H, embedded in the walls of the primary combustion-chamber, and is delivered through the discharge-orifices $h$ at the mouth of the combustion-chamber, beneath the boiler W.

Having thus described my invention, what I claim as new, and desire to secure by Letters Patent, is—

1. The herein-described method of heating the gaseous fuel of furnaces, which consists in mixing with the main body of gas highly-heated products of combustion or flame resulting from the complete combustion of a fractional portion of said main body of gas, substantially as described.

2. The herein-described process of heating the gaseous fuel of furnaces, which consists in dividing the main volume of gas as it issues from the generator, burning completely the smaller portion, and then mixing the highly-heated products of combustion or flame therefrom with the main body of the gas, substantially as described.

3. The herein-described process of preheating the air-supply of furnaces, which consists in burning separately a comparatively small volume of gas, and then, before delivery to the main combustion-chamber, mixing with the resultant highly-heated products of combustion or flame a comparatively large volume of air, constituting the main air-supply of the furnace, substantially as set forth.

4. The herein-described method of heating separately the gas and air supply of furnaces, which consists in mixing with the main volume of gas highly-heated products of combustion, mixing with the main volume of air highly-heated products of combustion, and finally mixing the highly-heated gas and air, substantially as described.

5. The herein-described process of heating gaseous fuel in furnaces, which consists in mixing with the main volume of gas highly-heated products of combustion, heating separately the volume of air to support combustion, and finally mixing the highly-heated gas and air, substantially as described.

6. The herein-described method of heating the gaseous fuel of furnaces, which consists in dividing the main volume of gas as it issues from the generator, burning a fractional portion of the gas, and mixing the hot products of combustion with the main gas-supply, burning a further fractional portion of the gas and mixing the hot products of combustion with the air-supply, and finally mixing the heated gas and air, substantially as described.

7. In a furnace, the combination, with the main gas-supply chamber, of a gas-delivery chamber and a primary gas-combustion chamber, each connected therewith, and a gas-heating chamber connected with the gas-delivery and primary combustion chambers, substantially as described.

8. In a furnace, the combination, with the gas-supply chamber, of a primary combustion-chamber connected therewith, wherein a volume of gas is completely burned, and an air-preheating chamber connected with said primary combustion-chamber, and having an opening of a size adapted to admit a large volume of air, constituting the main air-supply of the furnace, substantially as and for the purpose set forth.

9. In a furnace, the combination, with the main gas-supply chamber, of a delivery-chamber for the main volume of unburned gas, a separate primary combustion-chamber wherein a fractional portion of the gas may be burned, a gas-heating chamber, and an air-supply chamber, substantially as described.

10. In a furnace, the combination, with the generator, of a primary combustion-chamber, a separate delivery-chamber for the main volume of unburned gas, and a gas-heating chamber, substantially as described.

11. In a furnace, the combination, with a gas-producer, of a separate primary combustion-chamber wherein a volume of gas may be burned, and an air-preheating chamber having a delivery-opening of a size adapted to admit the main volume of air constituting the air-supply of the furnace, all constructed substantially as described.

12. In a furnace, the combination, with the gas-chamber A, of the primary combustion-chambers B and B', the gas-delivery chamber C, the gas-heating chamber D, the air-heating chamber E, and mixing-chamber F, substantially as described.

13. In a furnace, the combination of the generator A, the primary combustion-chambers B B', having gas-inlets $b$, $b'$, and $b^4$, provided with valves $b^2$ $b^3$ $b^5$, the gas-delivery chamber C, the gas-heating chamber D, and the air-heating chamber E, provided with the induction-pipes E', having a regulating-valve, $e$, substantially as described.

JOHN H. CREMER.

Witnesses:
GEORGE P. FISHER, Jr.,
FREDERICK S. BAKER.